(12) United States Patent
Shuster et al.

(10) Patent No.: US 7,099,956 B2
(45) Date of Patent: Aug. 29, 2006

(54) METHOD AND APPARATUS FOR CONDUCTING DOMAIN NAME SERVICE

(75) Inventors: Brian Mark Shuster, Stateline, NV (US); Gary Stephen Shuster, Oakland, CA (US)

(73) Assignee: Ideaflood, Inc., Zephyr Cove, NV (US)

( * ) Notice: Subject to any disclaimer, the term of this patent is extended or adjusted under 35 U.S.C. 154(b) by 521 days.

(21) Appl. No.: 09/773,298

(22) Filed: Jan. 31, 2001

(65) Prior Publication Data

US 2001/0034657 A1    Oct. 25, 2001

Related U.S. Application Data

(60) Provisional application No. 60/179,322, filed on Jan. 31, 2000.

(51) Int. Cl.
*G06F 15/16* (2006.01)
(52) U.S. Cl. ......................... 709/245; 705/26
(58) Field of Classification Search ................. 705/26, 705/27; 709/245
See application file for complete search history.

(56) References Cited

U.S. PATENT DOCUMENTS

| | | | | |
|---|---|---|---|---|
| 5,777,989 | A * | 7/1998 | McGarvey | 370/254 |
| 5,881,131 | A * | 3/1999 | Farris et al. | 379/15.03 |
| 6,298,341 | B1 * | 10/2001 | Mann et al. | 705/59 |
| 6,338,082 | B1 * | 1/2002 | Schneider | 709/203 |
| 6,412,014 | B1 * | 6/2002 | Ryan | 709/245 |
| 6,427,170 | B1 * | 7/2002 | Sitaraman et al. | 709/226 |
| 6,442,602 | B1 * | 8/2002 | Choudhry | 709/218 |
| 6,486,829 | B1 * | 11/2002 | Ahlm | 342/375 |
| 6,560,634 | B1 * | 5/2003 | Broadhurst | 709/203 |
| 6,625,594 | B1 * | 9/2003 | Rolland et al. | 707/3 |
| 6,687,746 | B1 * | 2/2004 | Shuster et al. | 709/223 |
| 6,880,007 | B1 * | 4/2005 | Gardos et al. | 709/225 |
| 2001/0034657 | A1 * | 10/2001 | Shuster et al. | 705/26 |
| 2002/0178234 | A1 * | 11/2002 | Birchley | 709/217 |
| 2005/0102354 | A1 * | 5/2005 | Hollenbeck et al. | 709/203 |

FOREIGN PATENT DOCUMENTS

| WO | WO 01/29710 | * | 4/2001 |
|---|---|---|---|
| WO | WO 01/29710 A2 | * | 4/2001 |

OTHER PUBLICATIONS

Lichty, Tom; Watson, Jennifer; "The Official American Online Tour Guide;" The Coriolis Group, Inc.; p. 111-131, 438-443; 1998.*

(Continued)

*Primary Examiner*—Mark Fadok
(74) *Attorney, Agent, or Firm*—Connolly Bove Lodge & Hutz LLP (57) ABSTRACT

A method for conducting Internet domain name service to users connected to the Internet comprises an automated procedure for transferring Internet domain name service from a domain name owner to a domain name manager. This method further comprises Internet sub-domain name services to prospective buyers based on domain names transferred to the domain name manager. Messages requesting domain name service, including requests from domain name owners to sub-license their particular domain name to prospective sub-domain name buyers and from prospective sub-domain name buyers to license available sub-domain names, are received and responded to by an automated domain name management system. This automated domain name management system further comprises an interactive website which includes a database, search engine, and Web server.

18 Claims, 6 Drawing Sheets

OTHER PUBLICATIONS

"Microsoft Press Computer Dictionary, Third Edition;" Microsoft Press; p. 506;1997.*

Wooley, Scott, Master of your domain, Forbes, Jul. 26, 1999. vol. 164, Iss 2, p. 244, 1 page.*

Rueters, Mattel sues over barbie web names; Chicago Tribune, Feb. 22, 1999.*

PR Newswire, Regselect offers independent advice about dotcom deals, May 30, 2000.*

Buisness wire, network solutions welcomes new registrars, Apr. 23, 1999.*

Shimamura, Hisashi, A domain cluster interface for WWW search, Date not known.*

* cited by examiner

METHOD AND APPARATUS FOR CONDUCTING DOMAIN NAME SERVICE

CROSS-REFERENCE TO RELATED APPLICATION

This application claims priority pursuant to 35 U.S.C. §119(e) to U.S. Provisional Application Number 60/179,322, filed Jan. 31, 2000, which application is specifically incorporated herein, in its entirety, by reference.

BACKGROUND OF THE INVENTION

1. Field of the Invention

The present invention relates to a method for conducting internet domain name service. In particular, this invention pertains to an automated procedure for licensing sub-domain names via an Internet portal.

2. Description of Related Art

A domain name is a unique address that identifies a computer or network that is connected to the Internet. A particular domain name can be comprised of different domain name levels. Domain names begin with a top level domain name with each subsequent domain name level separated by a dot. Domain level hierarchy is such that top level (level one) domain names are those names located furthest to the right of the entire domain name. These level one domain names include descriptors such as 'com', 'org', 'net', or any other designation approved by the Internet Corporation for Assigned Names and Numbers (ICANN). Level two domain names are located to the immediate left of the top level domain name while level three domain names are to the immediate left of the level two domain names. Additional domain name levels sequentially follow, from right to left, according to this same scheme. For purposes of the discussion herein, domain names are referred to as only the combination of level one and level two domain names. Domain name levels greater than two will, meanwhile, be sequentially referred to as sub-domains from right to left. As an example, in the website "www.sub2.sub1.foo.com", the term "foo.com" is the domain name while terms "sub1", "sub2", and "www" are respectively sub-domains one, two, and three.

According to current domain name architecture and available sales methodology on the Internet, rights to use a single domain name are transferred only to a single entity, which entity then uses that domain name as well as all variants thereof. Legally, this entity has only a license to use the domain name; however, as long as the name is unrelated to someone else's trademark or legal right to use the name, this license awards full administrative sovereignty over the domain name. This entity thus becomes the administrative contact for the particular domain name. As the administrative contact, this entity can speak on behalf of the organization for which the domain name is registered and should be able to answer non-technical questions about the organization's plans for the name and procedures for establishing sub-domains. Also, the administrative contact should be able to represent the organization regarding use of the name. The licensee is commonly referred to in the art as the "owner" of the domain, although an actual ownership interest is not created. For convenience, the licensee will be referred to herein as the "owner" to be consistent with general nomenclature in the art.

Current domain name vendors do not license rights to sub-domain names. This limitation prevents full exploitation of the value of domain names, as many good names, such as "rover.ismydog.com", are not available for transfer. A further complication limiting the creation of sub-domain/domain name combinations is the current domain naming and resolution architecture. Once a right to use a domain name is transferred, the licensee of that name controls domain name service for all sub-domains related to that domain name.

Registrars for domain names provide a name service for all level two domains emanating off of a level one domain. In order for sub-domains (domain names of level three or greater) to be licensed in a manner similar to domains, the provider of name service for the domain name must be able to provide individual name service for all sub-domains of the domain. However, this is not practical unless the registrar is able to provide name service for a critical mass of domain names. It would therefore be advantageous to permit the automated aggregation of name service for numerous domain names.

SUMMARY OF THE INVENTION

The present invention is directed to a method in which domain name owners and prospective sub-domain name buyers are linked through an Internet portal.

In an embodiment of the invention, a method for conducting Internet domain name service to users connected to the Internet comprises an automated procedure for transferring Internet domain name service from a domain name owner to a domain name manager. Furthermore, this method offers Internet sub-domain name services to prospective buyers based on those domain names transferred to the domain name manager. Messages requesting domain name service, which include requests from domain name owners to sub-license their particular domain name to prospective sub-domain name buyers and from prospective sub-domain name buyers to license available sub-domain names, are received and responded to by an automated domain name management system. This automated domain name management system further comprises an interactive website which includes a database, search engine, and Web server.

A more complete understanding of the method for conducting domain name service will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention is directed towards an automated method for providing domain name service. In particular, this invention satisfies the need for linking domain name owners with prospective sub-domain name buyers via the Internet.

Figure 1:
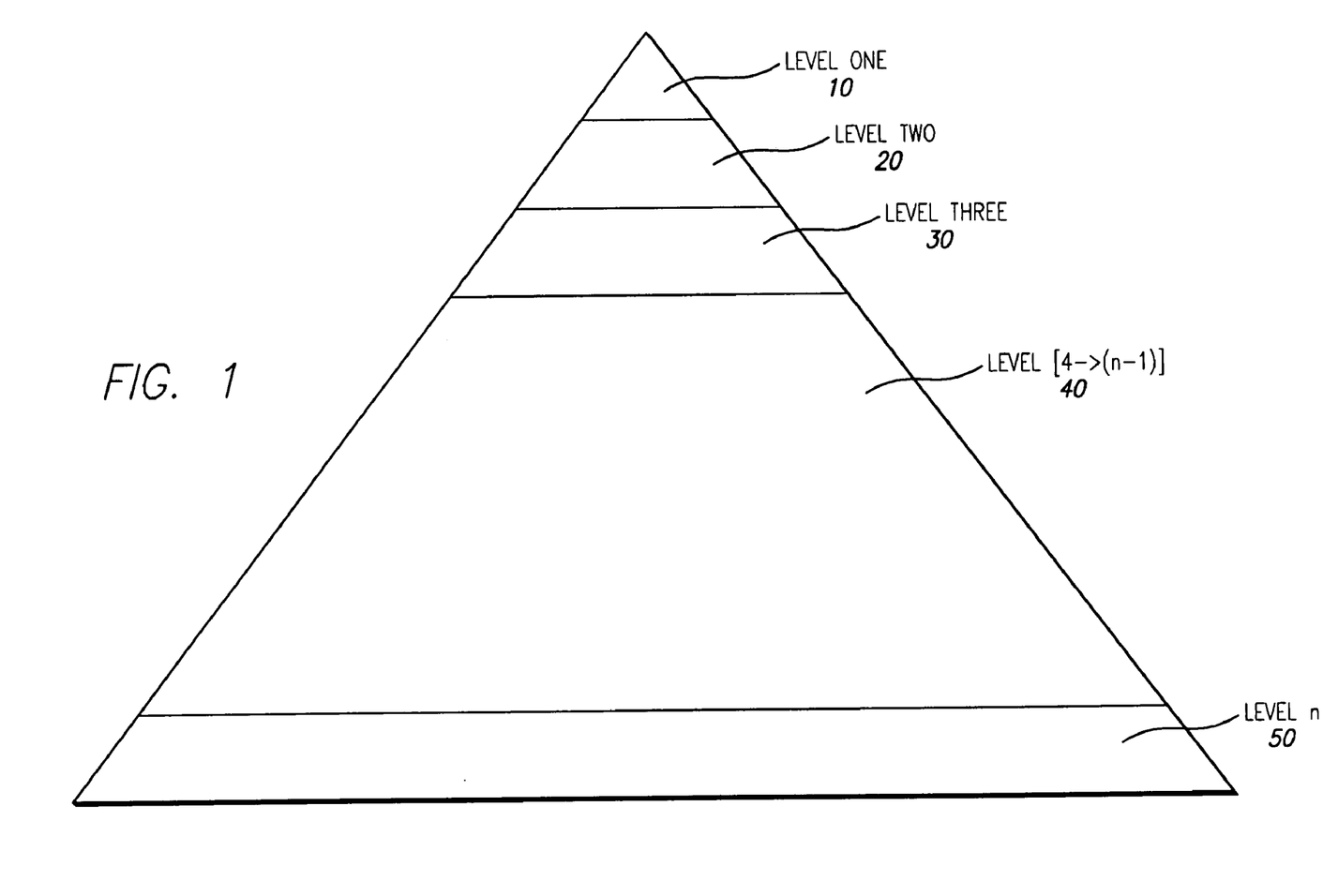
FIG. 1 is a pyramid diagram showing the current domain naming architecture.

Referring first to FIG. 1, a pyramid diagram demonstrating the current domain naming architecture is shown. This naming structure is comprised of several possible domain name levels. The top level of this structure represents all level one domain names 10 available to the Internet community, followed immediately below by all possible level two domain names 20 and then by all possible level three domain names 30. Also included in this diagram are domain name levels four through (n−1) 40 and domain name level n 50, where n represents an undefined maximum number of domain name levels.

Figure 2:
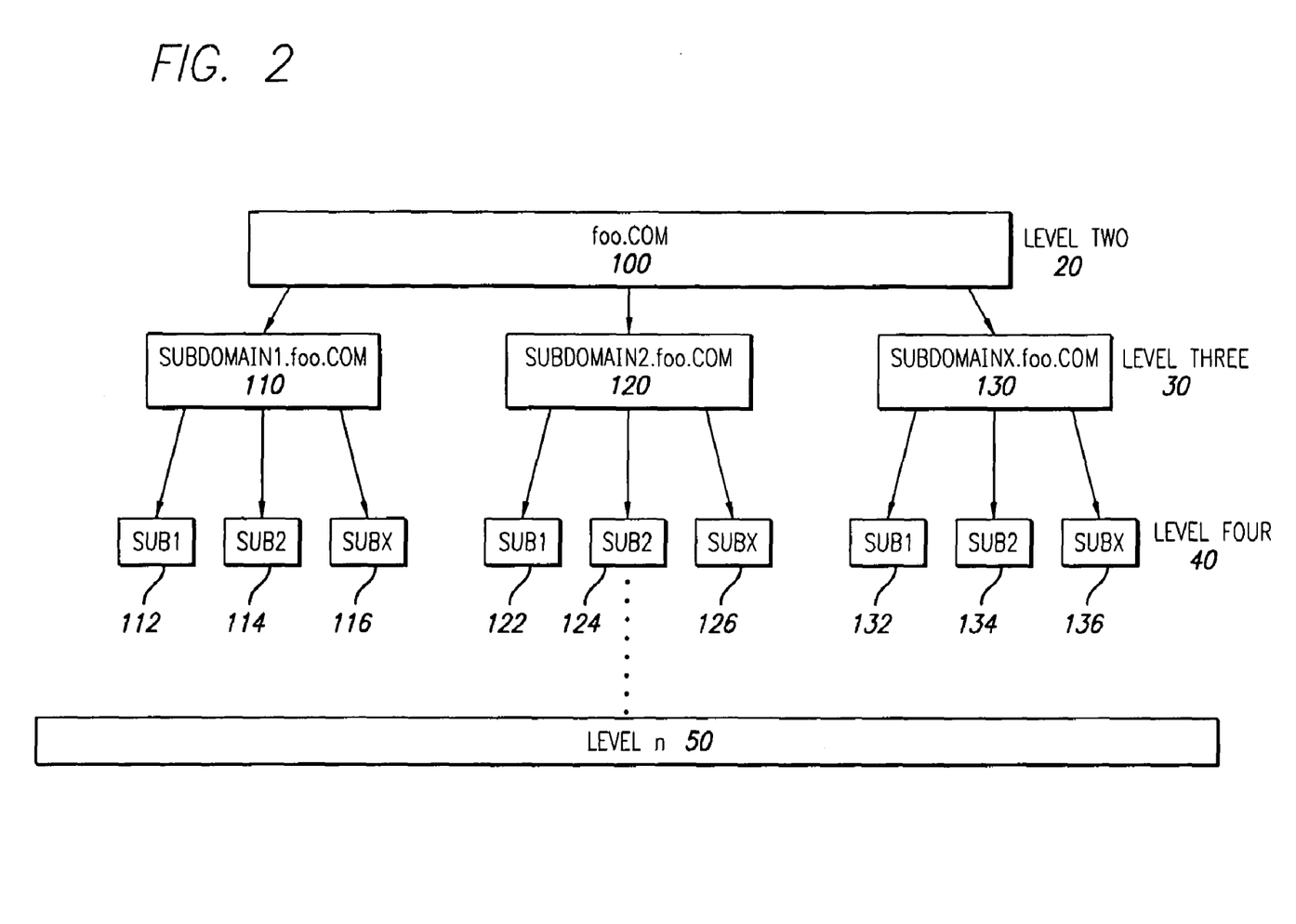
FIG. 2 is an illustration of the current sub-domain naming architecture.

As can be seen from FIG. 1, an increasing number of possible domain/sub-domain name combinations are available as the number of levels increases. This behavior is better understood by taking an arbitrary domain name and analyzing all possible sub-domain names available to it. In FIG. 2, for example, the domain name "foo.com" 100 can theoretically host such sub-domains as "subdomain1.foo.com" 110, "subdomain2.foo.com" 120, and all other possible sub-domains "subdomainX.foo.com" 130, where "subdomainX" represents every possible alphanumeric combination allowed by ICANN to represent a sub-domain. Consequently, each respective sub-domain 110 120 130 can host other sub-domains 112, 114, 116, 122, 124, 126, 132, 134, and 136.

For example, "subdomain1.foo.com" 110 can host "sub1.subdomain1.foo.com" 112, "sub2.subdomain1.foo.com" 114, and all other possible sub-domains "subX.subdomain1.foo.com" 116, where "subX" again represents every possible alphanumeric combination allowed by ICANN to represent a sub-domain. The number of potential domain/sub-domain name combinations continues to rapidly grow until level n. However, since the creation and sub-licensing of sub-domains is the sole responsibility of individual domain name owners, and not a centralized registrar, a communication link between domain name owners and potential sub-domain buyers usually does not exist. Thus, although the number of potential domain/sub-domain name combinations is far greater than the number of simple domain name combinations, domain name registration procedure is structured such that many sub-domain names are left unused. This invention addresses the need to fill the void left behind by this procedure.

Figure 3:
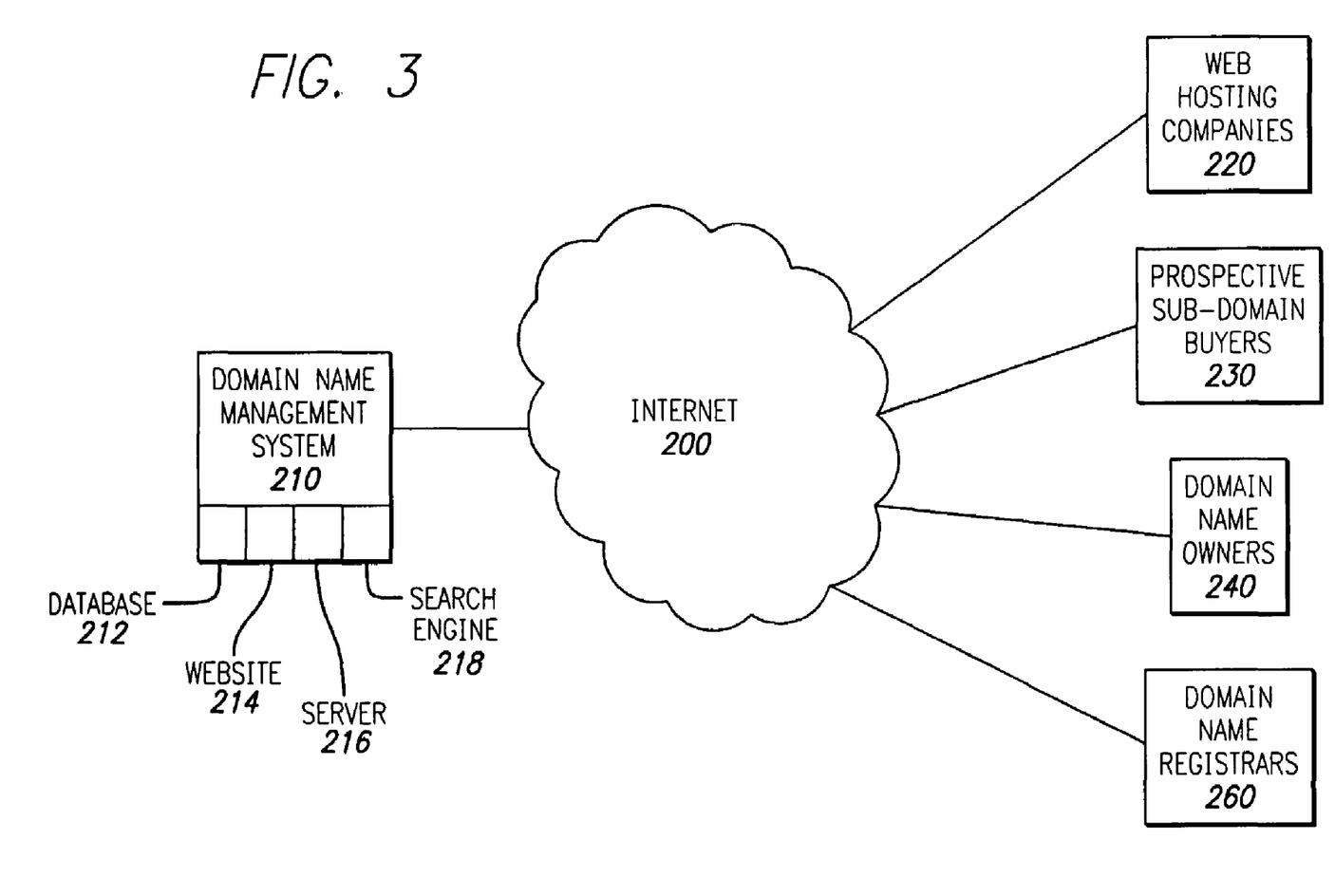
FIG. 3 is a block diagram demonstrating a preferred embodiment of the invention.

In FIG. 3, a block diagram is shown demonstrating a preferred embodiment of the invention. Through the Internet 200, a domain name management system 210 is shown to communicate with web hosting companies 220, domain name owners 240, prospective sub-domain buyers 230, and domain name registrars 260. Furthermore, the domain name management system 210 is shown to be comprised of a database 212, website 214, server 216, and search engine 218. It should be noted that each of these entities may be provided by either a computer, personal digital assistant (PDA), cellular telephone, or other web-enabled device.

In the preferred embodiment, domain name owners 240 request service from the domain name management system 210 through its interactive website 214 on the Internet 200. In their request for service, domain name owners 240 make a preliminary agreement to transfer all name service records to the domain name management system 210. An automated procedure within the domain name management system 210 then confirms this transfer with the domain name registrar 260. After this confirmation is complete, authority over the particular domain name is transferred from the domain name owner 240 to the domain name management system 210.

Once a domain name is signed up for service, the domain name management system 210 makes a query of the level one domain name servers to determine where the domain currently points, including its mail exchanger records, 'www' sub-domain records, and level one domain records. The domain name management system 210 also makes a query of the domain name server that currently serves records for the domain and requests a transfer of all name service records for the domain. The domain name management system 210 then updates its own records to reflect the existing name service. A request for a change to the domain name service is then automatically created and submitted to the registrar 260 for the domain and/or sent to the administrative or technical contacts for the domain. Once this transfer in domain name service is complete, requests for this particular domain name are responded to with a statement that name service information for this domain can be found at the domain name management server 216.

Figure 4:
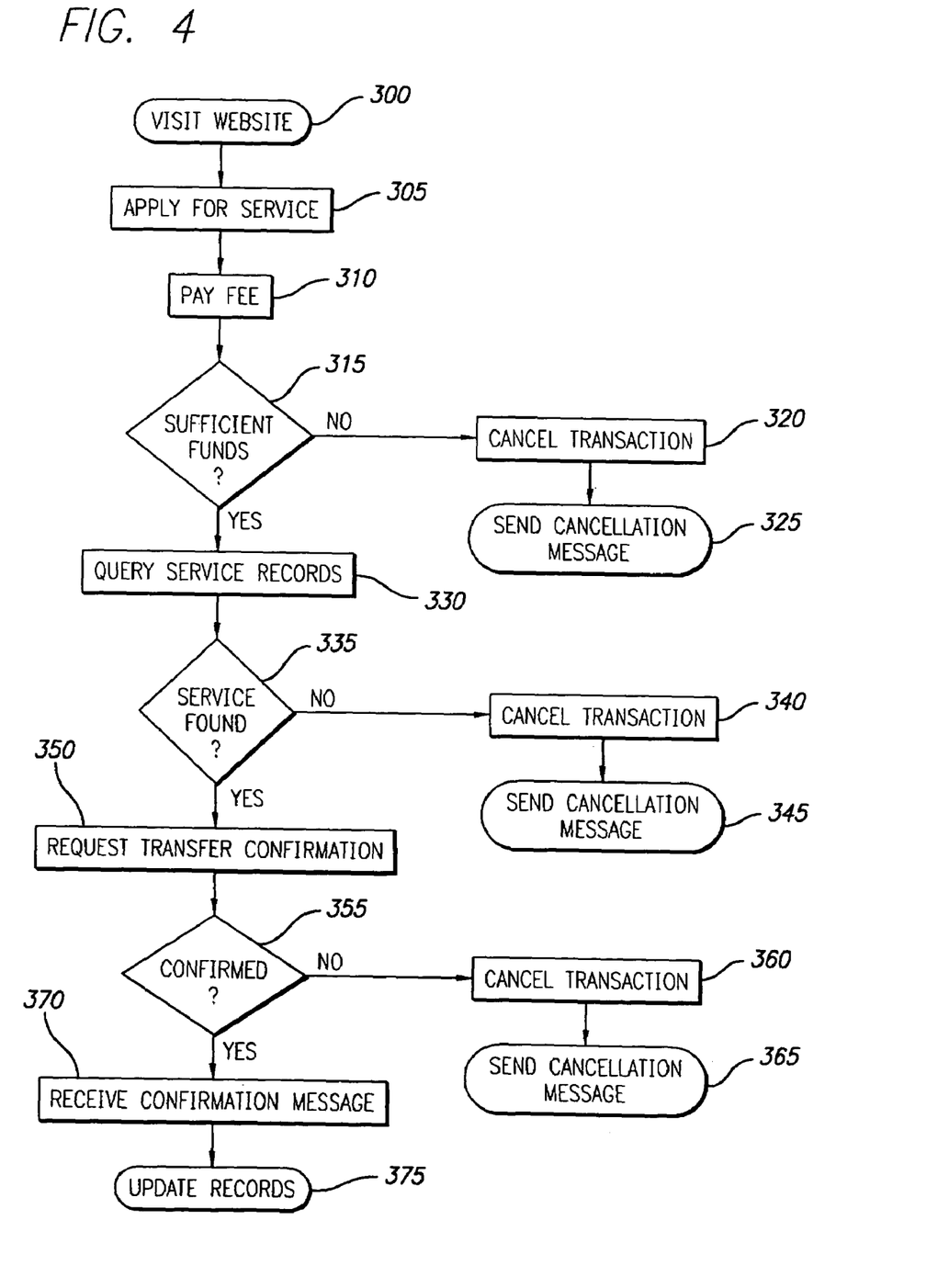
FIG. 4 is a flow chart outlining the steps for processing domain name service applications from domain name licensees according to a preferred embodiment of the invention.

In FIG. 4, a flow chart outlining the steps for processing applications for domain name service from domain name owners 240 according to a preferred embodiment of the invention is shown. Domain name owners 240 begin this process by visiting the domain name management website 214 at step 300. At this website 214, domain name owners 240 fill out an on-line application requesting service at step 305. A processing fee may be paid (via credit card) at step 310. If sufficient funds are available at step 315, the domain name management system 210 searches the Internet 200 for the domain name's service records at step 330; otherwise, at step 320 the transaction is cancelled and a cancellation message is sent to the domain name owner 240 at step 325. If a domain name service for the particular domain name is found at step 335, a transfer of service confirmation is requested at step 350; otherwise, at step 340 the transaction is cancelled and a cancellation message is sent to the domain name owner 240 at step 345. The domain name management system 210 then awaits transfer confirmation from the domain name service provider at step 355. If this transfer is accepted, a confirmation message is received at step 370; otherwise, at step 360 the transaction is cancelled and a cancellation message is sent to the domain name owner 240 at step 365. Upon receiving transfer confirmation from the original domain name service provider, the domain name management system 210 assigns an Internet Protocol (IP) address to that particular domain and updates its database 212 at step 375. Finally, at step 380, a message is sent to the domain name owner 240 confirming service for that particular domain name. It should be noted that registration for hosting service is dealt with in a separate procedure (described later) by the domain name management system 210. Until a hosting service is chosen, only the newly registered domain name, and not a particular website, is linked to the IP address assigned at step 375. This is known in the art as "parking" a domain, and will herein be referred to as such.

People who desire to sub-license a sub-domain from the domain name management system 210 follow a similar procedure. As described above, such sub-licensees do not obtain an ownership interest in the sub-domain, but merely obtain a license. Nevertheless, for convenience and clarity, these potential sub-licensees will be referred to as "buyers". Prospective sub-domain buyers 230 would simply visit the domain name management website 214 and purchase available sub-domains under domain names found in the domain name management database 212. The revenue generated from this purchase is then distributed between the domain management system 210 and all owners 240 of upper level domains from which the sub-domain buyer 230 is hosting its sub-domain. Upon clearance of payment information (or, optionally, before), name service for the sub-domain is then pointed as directed by the new sub-licensee or owner.

Figure 5:
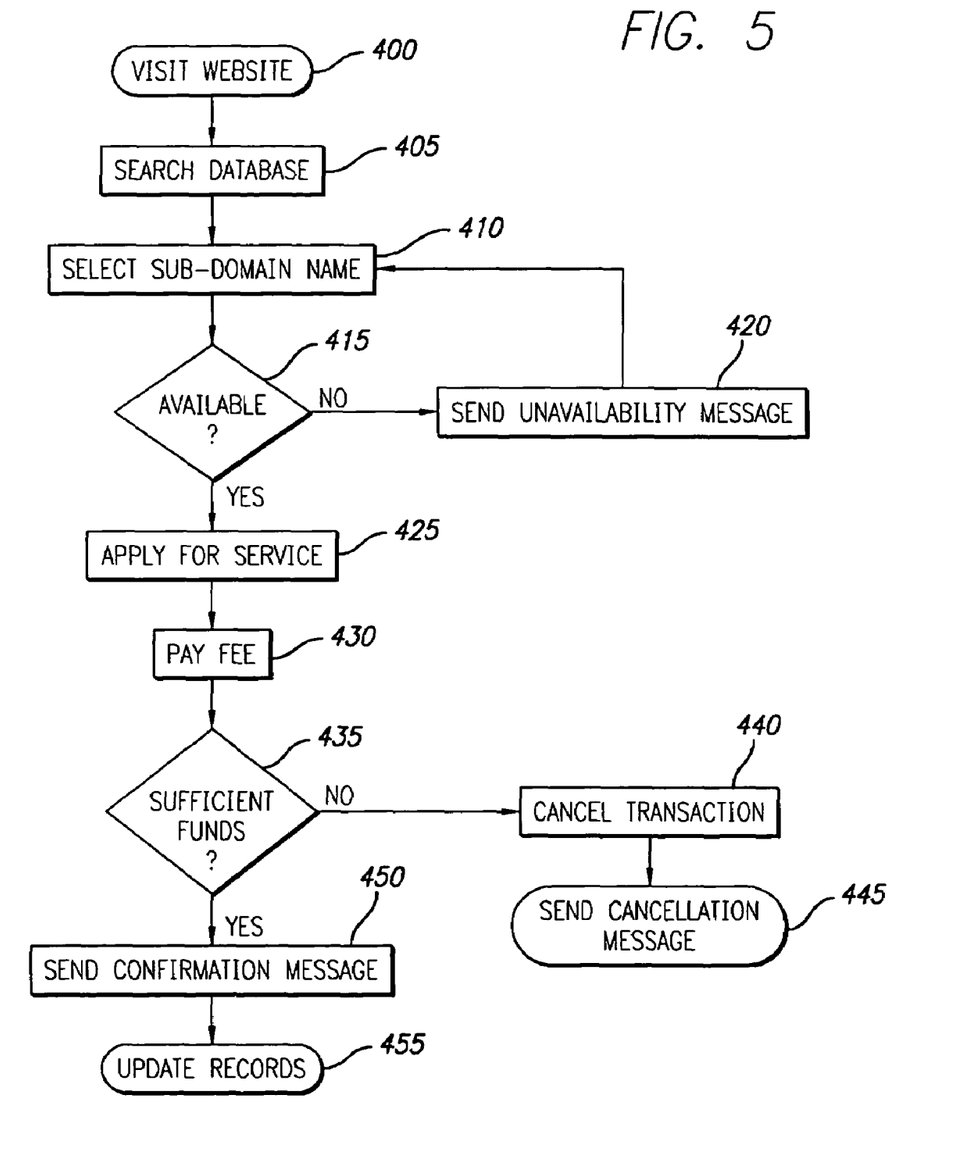
FIG. 5 is a flow chart outlining the steps for processing sub-domain name service applications from prospective sub-domain name licensees according to a preferred embodiment of the invention.

In FIG. 5, a flow chart outlining the steps for processing sub-domain name service applications from prospective sub-domain name buyers 230 according to a preferred embodiment of the invention is shown. Prospective sub-domain name buyers 230 begin this process by visiting the domain name management website 214 at step 400. At this website 214, prospective sub-domain name buyers 230 use the domain name management search engine 218 to locate domain names available in its database 212 at step 405. After locating a particular domain name, the desired sub-domain name is select at step 410. If this sub-domain name is currently available at step 415, the prospective sub-domain name buyer 230 fills out an on-line application requesting service at step 425; otherwise, an unavailability message with a list of similar sub-domains is sent at step 420, and the prospective sub-domain name buyer 230 is asked to reselect a sub-domain name at step 410. After applying for service at step 425, the prospective sub-domain name buyer 230 pays a processing fee (via credit card) at step 430. If sufficient funds are available at step 435, the domain name management system 210 updates its database 212 to include this sub-domain name at step 450; otherwise, at step 440 the transaction is cancelled and a cancellation message is sent to the prospective sub-domain name buyer 230 at step 445. Once the domain name management system 210 updates its database 212 at step 450, a message confirming the transfer of rights of the particular sub-domain name is sent both to the sub-domain name buyer 230 and the domain name owner 240 at step 455. It should be noted that, when applying for service at step 425, prospective sub-domain name buyers 230 are given the option of hosting additional sub-domains off of their sub-domain. The availability status of sub-domains emanating from this particular sub-domain is then updated accordingly at step 450.

Figure 6:
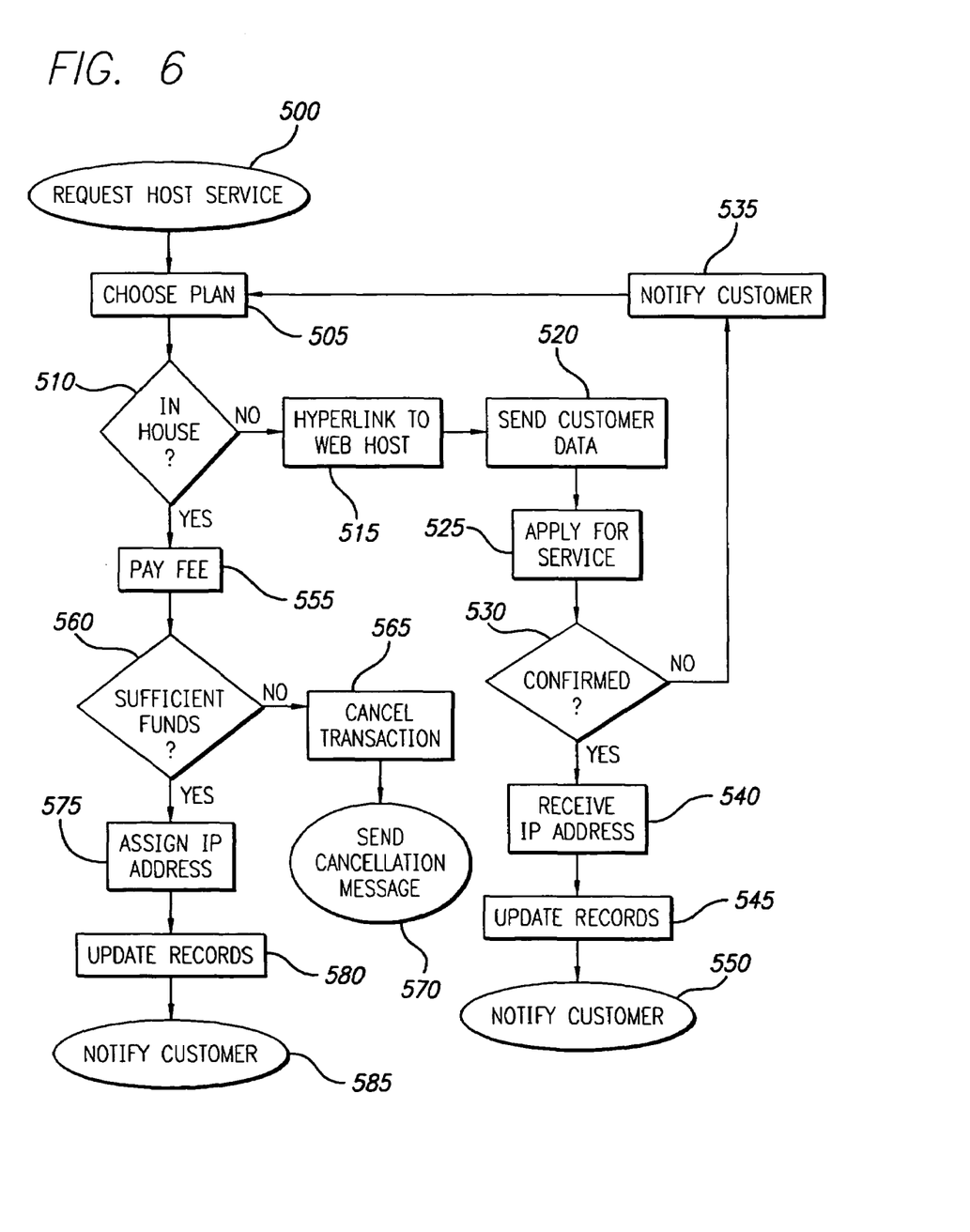
FIG. 6 is a flow chart illustrating an interactive method for acquiring web hosting service according to a preferred embodiment of the invention.

In a preferred embodiment of the invention, websites managed by the domain name management system 210 can be hosted by various web hosting companies 220. In FIG. 6, a flow chart illustrating an interactive method for acquiring web hosting service is shown according to a preferred embodiment of the invention. As stated previously, all newly registered domains and sub-domains are parked at their respective IP addresses until a web hosting plan is chosen. This procedure begins at step 500 when a customer requests web host services from the domain name management website 214. The customer then chooses from a variety of different hosting plans offered at step 505. If at step 510, it is determined that the desired plan is provided by the domain name management system 210, a hosting fee for that particular plan is paid at step 555; otherwise, the customer is hyper-linked to the web host company providing the desired service at step 515. For hosting plans provided by the domain name management system 210, the payment of hosting fees at step 555 is followed by a verification of sufficient funds at step 560. If sufficient funds are available at step 560, an IP address is automatically assigned by the domain name management system 210; otherwise, at step 565 the transaction is cancelled and a cancellation message is sent to the customer at step 570. After an IP address has been assigned at step 575, the domain name management database 212 is updated at step 580 and the customer is sent a service confirmation notice at step 585.

A similar procedure is used in the acquisition of hosting plans not provided by the domain name management system 210. After customers are hyper-linked to the website of their desired web hosting company 220 at step 515, customer contact information is sent to the hosting company 220 at step 520 followed by an application for service at step 525. If at step 530, confirmation of this service is received, an IP address is sent to the domain name management system 210 by the web hosting company 220 at step 540; otherwise, a notification is sent at step 535 and the customer is asked to re-select a hosting plan at step 505. After receiving an IP address at step 540, the domain name management system 210 updates its database 212 at step 545 and subsequently sends the customer a service confirmation notice at step 550.

Having thus described a preferred embodiment of a method for conducting domain name service, it should be apparent to those skilled in the art that certain advantages of the within described system have been achieved. It should also be appreciated that various modifications, adaptations, and alternative embodiments thereof may be made within the scope and spirit of the present invention. The invention is further defined by the following claims.

What is claimed is:

1. A method for assigning domain names configured according to a domain name system, each domain name including a user selected subdomain label to the left of a fully-qualified domain name, the method comprising:
   obtaining fully-qualified domain names associated with different corresponding host IP addresses in resource records of domain name servers from a plurality of domain name holders;
   communicating with the domain name servers to effect reassignment of name service records for the fully-qualified domain names, whereby the fully-qualified domain names are pointed to at least one IP address of a subdomain management system;
   maintaining a database of subdomain labels for the fully-qualified domain names, wherein each subdomain label is not associated with an IP address in the name service records, the database accessible by the subdomain management system and relating each subdomain label to a user-determinable address for content and to at least one of the fully-qualified domain names; and
   providing an interface interoperable with the database to relate user selected subdomain labels with user selected ones of the fully-qualified domain names to provide domain names, each domain name comprising a fully-qualified domain name and at least one subdomain label to the left of the fully-qualified domain name, wherein the subdomain management system is a separate entity from the domain name owners and the user.

2. The method of claim 1, further comprising receiving a request for content, comprising a domain name configured in accordance with the domain name system, the domain name comprising a fully-qualified domain name and at least one subdomain label to the left of the fully-qualified domain name.

3. The method of claim 2, further comprising directing the request to the user-determinable address related to the at least one subdomain.

4. The method of claim 3, wherein the directing step further comprises directing the request to the user-determinable address comprising a network address.

5. The method of claim 3, wherein the directing step further comprises directing the request to the user-determinable address comprising an address configured independently of the domain name system.

6. The method of claim 3, further comprising serving content in response to the request.

7. The method of claim 1, further comprising obtaining information for payment from the user for relating user selected subdomain labels to fully-qualified domain names in the database.

8. The method of claim 7, further comprising crediting a portion of the payment to a holder of the fully-qualified domain name.

9. The method of claim 2, wherein the maintaining step further comprises maintaining the database including subdomain labels associated as lower-level domains of other subdomain labels, wherein multiple subdomain labels are related to corresponding ones of the user-determinable addresses.

10. A system for aggregating a plurality of fully-qualified domain names for independent licensing of subdomain labels related thereto, each domain name including a user selected subdomain label to the left of a fully-qualified domain name comprising:

a subdomain management system, comprising a server connected to a network and operably associated with a database and with a memory, the memory holding instructions for;

obtaining fully-qualified domain names associated with different corresponding host IP addresses in resource records of domain name servers from a plurality of domain name holders;

communicating with the domain name servers to effect reassignment of name service records for the fully-qualified domain names, whereby the fully-qualified domain names are pointed to at least one IP address of the subdomain management system;

maintaining the database of subdomain labels for the fully-qualified domain names, wherein each subdomain label is not associated with an IP address in a zone file of any higher-level domain, the database relating each subdomain label to a user-determinable address for content and to at least one of the fully-qualified domain names; and providing an interface interoperable with the database to relate user selected subdomain labels with user-selected ones of the fully-qualified domain names to provide domain names, each domain name comprising a fully-qualified domain name and at least one subdomain label to the left of the fully-qualified domain name, wherein the subdomain management system is a separate entity from the domain name owners and the user.

11. The system of claim 10, wherein the instructions further comprise receiving a request for content, comprising a domain name configured in accordance with the domain name system, the domain name comprising a fully-qualified domain name and at least one subdomain label to the left of the fully-qualified domain name.

12. The system of claim 11, wherein the instructions further comprise directing the request to the user-determinable address related to the at least one subdomain.

13. The system of claim 12, wherein the directing step of the instructions further comprises directing the request to the user-determinable address comprising a network address.

14. The system of claim 12, wherein the directing step of the instructions further comprises directing the request to the user-determinable address comprising an address configured independently of the domain name system.

15. The system of claim 12, wherein the instructions further comprise serving content in response to the request.

16. The system of claim 10, wherein the instructions further comprise obtaining information for payment from users for relating user selected subdomain labels to fully-qualified domain names in the database.

17. The system of claim 16, wherein the instructions further comprise crediting a portion of the payment to a holder of the fully-qualified domain name.

18. The system of claim 11, wherein the maintaining step of the instructions further comprises maintaining the database including subdomain labels associated as lower-level domains of other subdomain labels, wherein multiple subdomain labels are related to corresponding ones of the user-determinable addresses.

* * * * *